United States Patent [19]

Tabet

[11] Patent Number: 4,509,751
[45] Date of Patent: Apr. 9, 1985

[54] GOLFER'S WIND INDICATOR AND BALL RETRIEVER

[76] Inventor: Michael A. Tabet, 1302 Pamela Pl., Norfolk, Va. 23513

[21] Appl. No.: 477,937

[22] Filed: Mar. 23, 1983

[51] Int. Cl.³ ............... A63B 69/36; A63B 57/00; G01F 15/00; B66F 11/00
[52] U.S. Cl. .................. 273/32 H; 116/273; 294/19.2; 273/32 F
[58] Field of Search ............ 294/19.2; 273/162 E, 273/32 F, 32 H; 73/188, 189; 116/264, 273, 2, 173, DIG. 7

[56] References Cited

U.S. PATENT DOCUMENTS

| 1,579,034 | 3/1926 | Roberts | 73/189 |
| 1,659,482 | 2/1928 | Dennemark | 294/19.2 |
| 3,141,696 | 7/1964 | Nau | 294/19.2 |
| 3,528,660 | 9/1970 | Kategian | 273/81.2 X |
| 4,150,826 | 4/1979 | Baldorossi et al. | 273/199 R X |
| 4,201,384 | 5/1980 | Barber | 273/199 R |

Primary Examiner—George J. Marlo
Attorney, Agent, or Firm—Bernard, Rothwell & Brown

[57] ABSTRACT

A golfer's implement is a combination of a wind indicator and a golf ball retriever with a telescoping handle for compactness and ease of carrying.

1 Claim, 4 Drawing Figures

U.S. Patent  Apr. 9, 1985  4,509,751
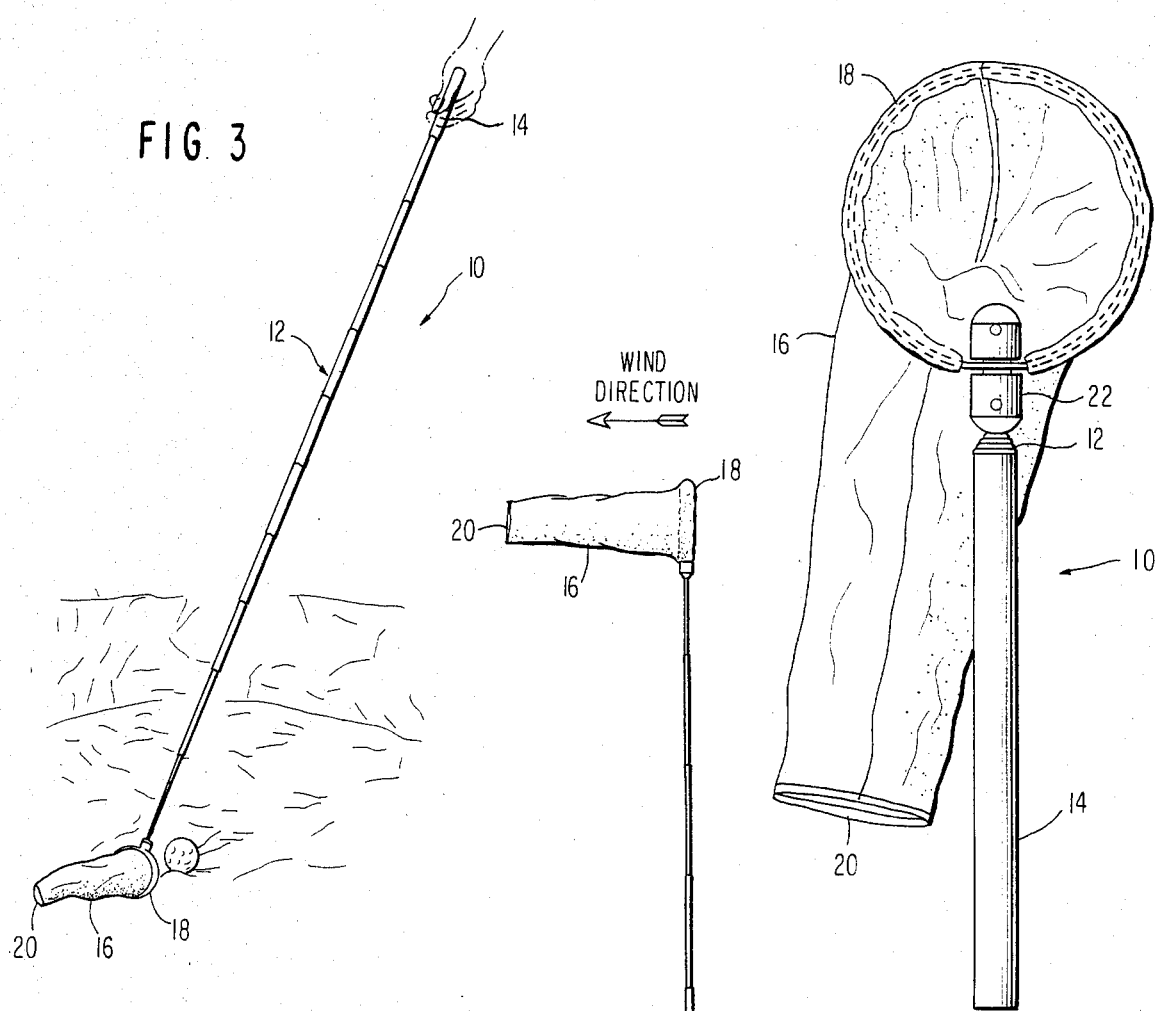
FIG. 3
FIG. 1
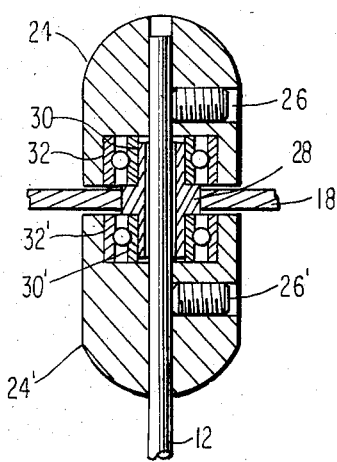
FIG. 2
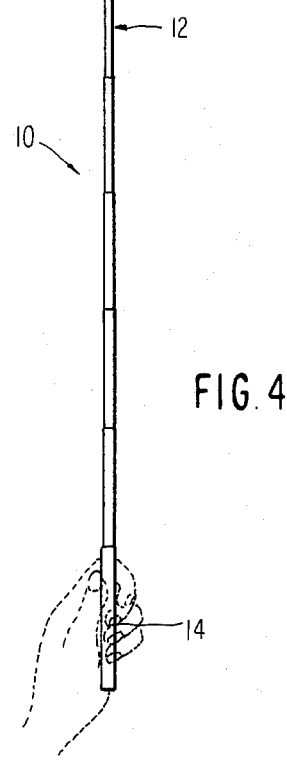
FIG. 4

GOLFER'S WIND INDICATOR AND BALL RETRIEVER

BACKGROUND OF THE INVENTION

1. Field of Invention

This invention relates to improvements in implements for golfers, and particularly to a combined golf ball retriever and wind indicator.

2. Prior Art

In the game of golf, it is important for golfers to know the direction and intensity of the ambient wind because the wind will affect the flight of the ball while in the air. For example, a cross wind can cause the ball to travel in the direction of the wind, while a following or a head wind can affect the distance of the shot.

Another need of a golfer is a means for retrieving golf balls that have been inadvertently shot into a water trap. A golfer who hits his golf ball in the water, even shallow water, must either get his shoes and feet wet in retrieving it or allow the relatively expensive ball to remain there and lose it. Golfers have recognized this situation and there are numerous examples of golf ball retrievers on the market and in the prior art for retrieving golf balls from relatively shallow water or any other inaccessible place. Examples of golf ball retrievers shown in prior patented art are shown, for example, in U.S. Pat. Nos. 1,659,482; 3,046,044; 3,136,573; 3,141,696.

There is also known in the prior art a golf hole marking flag which double-duties as a wind indicator as shown in U.S. Pat. No. 1,579,034.

There is a need in the art, presently unfulfilled, for a device which will not only retrieve golf balls, but will indicate the amount and intensity of the wind, which device is small and portable and can be conveniently carried by a golfer during his round of play.

SUMMARY OF THE INVENTION

This invention provides a combined golf ball retriever and wind indicator in a single implement in which the golf ball retriever is in the form of a wind sock having an open large end, large enough for a golf ball to go into, and a small end, too small for the golf ball to exit, so that the wind sock, when positioned on the end of an extensible handle, can be used as a golf ball retriever. When not being used as a golf ball retriever, the wind sock can be held into the air where it functions as a wind sock on the end of the portable telescoping rod to indicate for the golfer, the direction and intensity of the wind to allow the golfer to prepare and compensate for such in his next shot.

BRIEF DESCRIPTION OF THE DRAWINGS

In the accompanying diagram:

FIG. 1 is a perspective view of the combined golf ball retriever and wind indicator of this invention;

FIG. 2 is a cutaway view of the connector depicted in FIG. 1;

FIG. 3 is a side elevation view of the combined golf ball retriever and wind indicator of this invention functioning as a golf ball retriever;

FIG. 4 is a side elevation view of the combined golf ball retriever and wind indicator of this invention functioning as a wind indicator.

DESCRIPTION OF THE PREFERRED EMBODIMENT

Referring now to the drawings, a combined golf ball retriever and wind indicator generally indicated at 10 is shown in FIG. 1. The combined golf ball retriever and wind indicator 10 is comprised of an extensible telescoping rod member 12, a handle means 14, an annular wind sock and ball retrieving means 16, a rigid guide 18, a wind outlet 20 and a rotatable connector means 22.

As shown in FIG. 1, the extensible telescoping rod member 12 can be collapsed to afford a compact device that is easily carried by a golfer during a round of play. As shown in FIGS. 3 and 4, when the golfer desires to use the device for one of its two functions, the extensible telescoping rod member 12 may be extended to its full extent to allow the golfer to retrieve his golf ball from the water or to ascertain the direction and intensity of the wind. As shown in FIG. 1, the handle means 14 by which the golfer holds the device when in use, is disposed on the extensible rod member 12.

As shown in FIG. 1, the annular wind sock and ball retrieving means 16 is attached to a rigid guide 18 that defines the large annular wind inlet of the wind sock. Also as shown in FIG. 1 a wind outlet 20 is disposed on the annular wind sock and ball retrieving means 16, the wind outlet 20 being smaller in diameter than the wind inlet defined by the rigid guide 18. The wind inlet of the annular wind sock and ball retrieving means 16 is of a diameter larger than a golf ball and the wind outlet of the annular wind sock and ball retrieving means 16 is of a diameter smaller than a golf ball. This feature allows a golf ball to enter the annular wind sock and ball retrieving means 16 through the large annular wind inlet of the wind sock but prevents a golf ball from exiting through the wind outlet of the annular wind sock and ball retrieving means 16 so that the wind sock may function as a golf ball retriever. The material of the flexible wind sock may be a strong, quick drying, flexible fabric such as nylon.

As shown in FIG. 1, the rigid guide 18 and therefore the annular wind sock and ball retrieving means 16 is attached to the extensible telescoping rod member 12 by a rotatable connector means 22.

The rotatable connector means 22 shown in more detail in FIG. 2, is comprised of an upper connector half 24, a lower connector half 24', two rivets 26, 26', an annular sleeve 28, ring assemblies 30, 30' an upper connector half groove 32 and a lower connector half groove 32'.

As shown in FIG. 2, the upper connector half 24 is permanently attached to the extensible rod member 12 by the rivet 26 and the lower connector half 24' is permanently attached to the extensible rod member 12 by the rivet 26'. Also as shown in FIG. 2 an annular sleeve 28 is disposed on the rigid guide 18. The inside diameter of the annular opening of the sleeve 28 is larger than the outside diameter of the extensible rod member 12 which allows the rigid guide 18 and therefore the annular wind sock and ball retrieving means 16 to travel in a circular path in a plane perpendicular to the extensible telescoping rod member 12.

As shown in FIG. 2, the ring assembly 30 fits into the upper connector half groove 32 and the ring assembly 30' fits into the lower connector half groove 32'. The outside diameter of the ring assemblies 30, 30' is just slightly smaller than the diameter of the grooves 32, 32' to provide a tight and permanent fit.

As shown in FIG. 2, the sleeve 28 is adapted to fit into the annular openings of the ring assemblies 30, 30'. The outside diameter of the sleeve 28 is just slightly smaller than the inside diameter of the annular openings of the ring assemblies 30, 30' to provide a tight and permanent fit. A system of ball bearings is disposed between the last ring and the second to last ring in each of the ring assemblies 30, 30' to allow the rigid guide 18 and therefore the annular wind sock and ball retrieving means 16 to travel in an almost frictionless circular path in a plane perpendicular to the extensible telescoping rod member 12.

As shown in FIG. 3, the combination golf ball retriever and wind indicator 10 may be used by the golfer as a golf ball retriever by first extending the extensible telescoping rod member 12 to its fullest extent then grasping the device by the handle means 14 and finally capturing the ball in the annular wind sock and ball retrieving means 16 and removing the device and ball from the water or other obstacle.

As shown in FIG. 4, the combination golf ball retriever and wind indicator 10 may be used by the golfer as a wind indicator by first extending the extensible telescoping rod member 12 to its fullest extent then grasping the device by the handle means 14 and finally raising the device into the air. The annular wind sock and ball retrieving means 16 being free to rotate in a plane perpendicular to the extensible telescoping rod member 12, will orient itself with respect to the wind so that the wind is flowing in the direction of the wind outlet 20 from the large annular wind inlet 18, thus indicating the direction of the wind. The intensity of the wind may also be determined by the stability and angle of the wind sock relative to the horizontal plane of the wind.

In a preferred embodiment of this invention the extensible telescoping rod member 12 is composed of a metal extendible antenna-type device. Also, the annular wind sock and ball retrieving means 16 is composed of a light weight cloth-type material and is attached to the rigid guide 18 by encircling the guide with the cloth and sewing the cloth together.

I claim:

1. A combination golf ball retriever and wind indicator comprising:
   (a) an extensible and collapsible telescoping rod member;
   (b) a handle on one end of the rod member;
   (c) a wind sock and golf ball retrieving member on the other end of the rod member, the wind sock and golf ball retrieving member including an annular wind opening, a rigid guide for the annular wind opening and a wind outlet smaller than the opening, the opening and outlet connected by an annular sock of substantially solid fabric material, the sock diminishing in diameter from the opening to the outlet, the opening being of a diameter larger than a golf ball to allow passage of a golf ball therethrough, and the outlet being of a diameter smaller than a golf ball to prevent passage of a golf ball therethrough; and
   (d) means for enabling said wind sock and golf ball retrieving member to be rotated, relative to the handle, by the force of the wind,
wherein the sock, rod and handle may function as a wind sock and as a golf ball retriever, the combination golf ball retriever and wind indicator being compact, portable and easily carried by a golfer when collapsed.

* * * * *